Patented Mar. 20, 1951

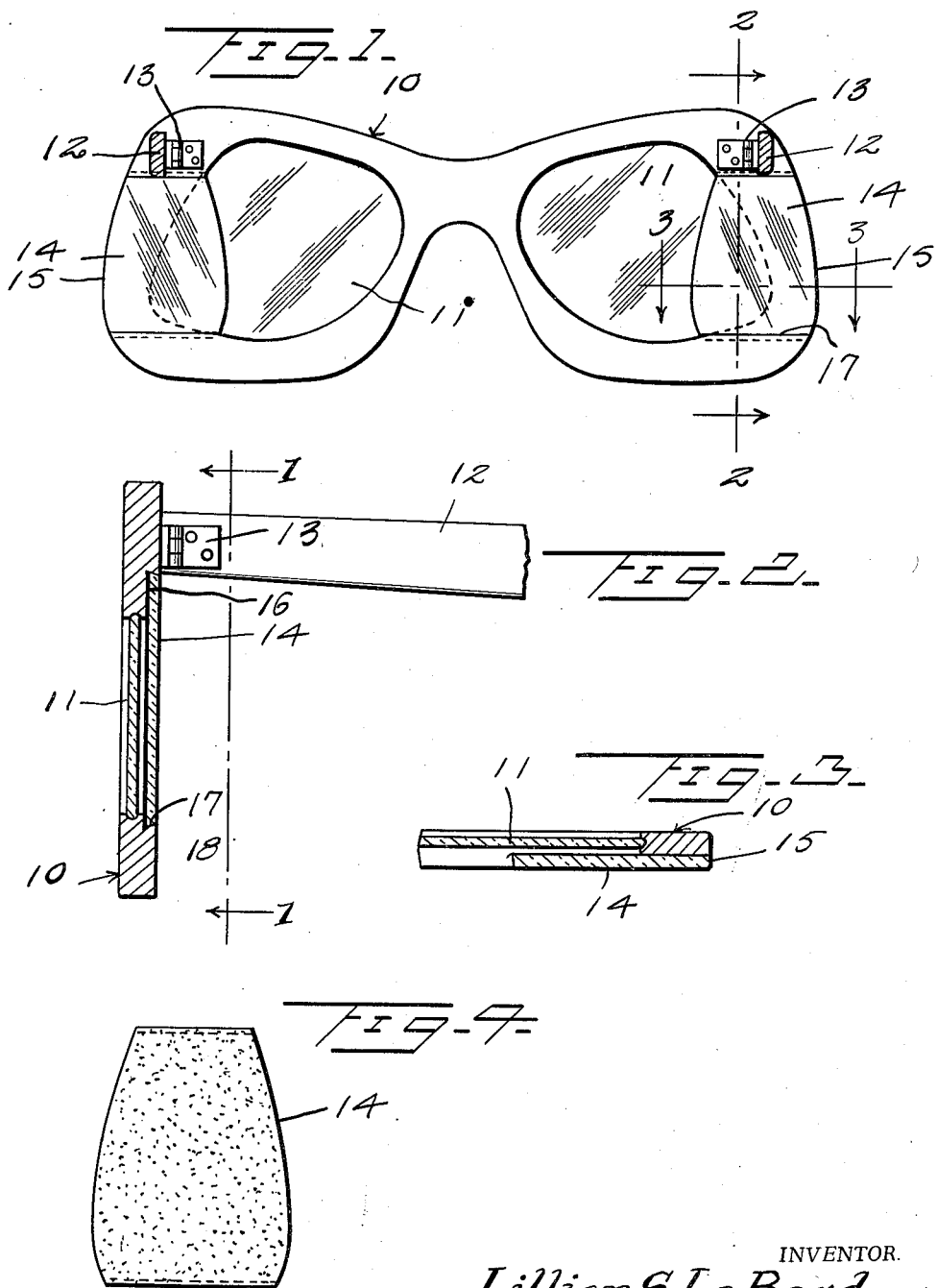

2,545,583

UNITED STATES PATENT OFFICE 2,545,583

SPECTACLES

Lillian S. La Bard, New York, N. Y.

Application June 9, 1949, Serial No. 98,128

1 Claim. (Cl. 88—41)

This invention relates to spectacles.

An object of this invention is to provide in combination with a pair of spectacles a pair of small mirrors secured to the frame whereby the user can see rearwardly on either side.

Another object of this invention is to provide in a spectacle frame means for removably mounting a mirror at each end of the frame in a position whereby normal vision through the lenses will not be obstructed by the mirrors, and the mirrors will not project laterally of the frame.

A further object of this invention is to provide in a spectacle frame which is formed out of composition material, a pair of rearview mirrors, a pair of wedge-shaped channels in the spectacle frame for receiving the mirrors, with the mirrors having transversely inclined upper and lower edges adapted to engage in said channels.

With the above and other objects in view, my invention consists in the arrangement, combination and details of construction disclosed in the drawing and specification, and then more particularly pointed out in the appended claim.

In the drawing,

Figure 1 is a sectional view taken on the line 1—1 of Figure 2, showing a pair of spectacles embodying my invention, Figure 2 is a fragmentary sectional view taken on the line 2—2 of Figure 1, Figure 3 is a fragmentary sectional view taken on the line 3—3 of Figure 1, Figure 4 is a detail front elevation of one of the mirrors embodied in this invention.

Referring to the drawing, the numeral 10 designates generally the frame of a pair of spectacles within which a pair of lenses 11 are mounted. The frame 10 has hingedly secured thereto a pair of temple bars 12 which are hingedly secured to the outer portions of the frame 10 by hinge means 13.

The frame 10 is formed of composition material such as plastic material or material which is known in the trade as zyl and is of substantial thickness.

A pair of mirrors 14 are removably mounted in the opposite ends of the frame 10, preferably below the plane of the temple bars 12, and each mirror 14 is provided with a convex vertical edge 15, the outer edge of each mirror being shaped to be coincident with the outer edge of the frame 10. The mirror 14 will project slightly in overlying position to the outer portion of a lens 11 and the frame 10 is provided with a cutout 16 in the side thereof within which the mirror 14 is adapted to be removably positioned. The cutout 16 is formed with parallel upper and lower edges which are formed with forwardly divergent walls 17, and the mirror 14 is provided with complementary parallel edges having forwardly divergent walls 18. The upper and lower edges of the mirror 14 are thereby formed as a key for engagement in a keyway which is formed by the inclined walls 17. Preferably the keyway 17 tapers inwardly a slight degree with the narrowest portion thereof inwardly so that the mirror 14 will be wedged into the keyway when the outer edge of the mirror is substantially flush with the outer edge of the frame 10.

The two mirrors 14 are of such width that they will provide a sufficiently large reflection so that the user may view rearwardly over a relatively wide area and at the same time each mirror 14 does not obstruct the normal view of the eye through the major portion of the lens 11.

With a pair of spectacles as hereinbefore described, a person may see rearwardly without turning the head. These spectacles are designed particularly for use in the operation of bicycles, motorcycles or other vehicles where a rear view mirror cannot readily be mounted in position on the vehicle.

I do not mean to confine myself to the exact details of construction herein disclosed, but claim all variations falling within the purview of the appended claim.

What I claim is:

A pair of spectacles comprising a lens frame having oppositely disposed outer edges, a pair of temple bars hingedly secured to said frame, a pair of lenses in said frame, said frame having a pair of cutouts in the rear side thereof disposed at each end and spaced rearwardly of said lenses, said cutouts being formed with substantially parallel upper and lower undercut edges to form a keyway extending inwardly from an outer edge of said frame, a mirror mounted in each cutout with top and bottom edges thereof slidably disposed in said keyways and having an outer edge adapted for flush positioning with the outer adjacent edge of the frame.

LILLIAN S. LA BARD.

REFERENCES CITED

The following references are of record in the file of this patent:

UNITED STATES PATENTS

| Number | Name | Date |
|---|---|---|
| 498,018 | Murray | May 23, 1893 |
| 1,556,371 | Stiriss | Oct. 6, 1925 |
| 1,843,094 | Rowan | Jan. 26, 1932 |
| 1,933,988 | Lewis | Nov. 7, 1933 |
| 1,986,688 | Thiele | Jan. 1, 1935 |

FOREIGN PATENTS

| Number | Country | Date |
|---|---|---|
| 679,438 | France | Apr. 12, 1930 |
| 466,034 | Great Britain | May 20, 1937 |